United States Patent [19]

Loofbourow et al.

[11] 4,169,667
[45] Oct. 2, 1979

[54] FILM BUFFER FOR MOTION PICTURE PROJECTORS

[75] Inventors: Donald I. Loofbourow, Canby; Robert E. Lach, Beaverton, both of Oreg.

[73] Assignee: GAF Corporation, New York, N.Y.

[21] Appl. No.: 780,536

[22] Filed: Mar. 23, 1977

[51] Int. Cl.² ............................................... G03B 1/56
[52] U.S. Cl. ...................................... 352/159; 226/44; 242/75.3
[58] Field of Search .................. 352/159; 226/44, 194; 242/75.3, 189, 205

[56] References Cited

U.S. PATENT DOCUMENTS

| | | | |
|---|---|---|---|
| 2,067,755 | 1/1937 | Dyer | 226/44 |
| 2,578,123 | 12/1951 | Bendfelt | 242/75.3 |
| 2,685,417 | 8/1954 | Bartelson | 242/75.3 |
| 2,838,304 | 6/1958 | Berkenhoff | 352/159 |
| 3,081,683 | 3/1963 | Horton | 354/253 |
| 3,942,883 | 3/1976 | Osborn et al. | 352/166 |
| 3,977,775 | 8/1976 | Riedel | 352/159 |

*Primary Examiner*—Monroe H. Hayes
*Attorney, Agent, or Firm*—Walter C. Kehm; J. Gary Mohr

[57] ABSTRACT

A film buffer for motion picture projectors is provided to permit the smooth advancement of the film through a projection gate, and to serve as a shock absorber to insure even projection. The buffer comprises a pair of rollers in fixed relation to each other juxtaposed to form a loop in the film in its path of travel, from a film supply reel to a film transport mechanism for incrementally advancing each frame of the film past the projection gate, a bracket for holding said rollers pivotally mounted on the face of the projector at a mid-point between the two rollers to permit swinging movement to increase or decrease the film loop size depending upon the tension of the film, a counterweight fixedly connected to the bracket to pivotally bias the same into a position to increase the film loop size, and a torsion spring positioned beneath the counterweight to engage and cushion the same as it moves toward a rest position. When the tension of the film varies only as a result of the intermittent operation of the film transport mechanism, the film loop tightens and loosens around the rollers and thereby employs the inherent elasticity of the film to urge the film from the supply reel in a smooth and uninterrupted manner. If the tension of the film increases due to a jam in the supply reel or the like, the inertia of the counterweight will be overcome allowing the bracket to swing into a position to reduce the loop size.

9 Claims, 2 Drawing Figures

FILM BUFFER FOR MOTION PICTURE PROJECTORS

BACKGROUND OF THE INVENTION

The present invention relates generally to motion picture film projectors of the type including sprocketless film transport means for incrementally advancing each frame of the film past a projection gate, and more particularly to an improved buffer interposed between a supply reel for the film and the film transport means to insure the smooth advancement of the film through the projection gate.

Various types of buffers have been known in the prior art, since it has long been recognized that it is necessary to absorb the irregularities in the movement of the film created by the incremental step-wise movement thereof through the film gate when the film is pulled therethrough by the film transport means, such as a claw engaging the sprocket holes of the film, and a continuously rotating supply reel. For this purpose, the self-elasticity of the film has been utilized by looping the film around a stationary or swingable roller disposed between the supply reel and the projection gate. Buffers have also been provided wherein a swingable roller is spring loaded into a loop forming position. It has been found that such buffers operate satisfactorily as long as the film offers a relatively constant resistance to forward movement under the action of the film advancement mechanism. Accordingly, such conventional buffers are fully capable of compensating for the fact that the supply reel rotates continuously, whereas the film transport mechanism advances the film incrementally through the projection gate. In this regard, the buffer repeatedly swings between two positions to decrease and increase the loop size, and hence the film path distance, the first as a result of increasing tension wherein the film is pulled by the transport means, and the second as a result of the elasticity of the film as the supply reel rotates by inertia when the transport means returns to advance the next frame.

However, the aforementioned conventional buffers do not operate satisfactorily when the tension of the film fluctuates for reasons other than the fact that the film transport means draws the film intermittently off a continuously rotating supply reel. This can occur if the supply reel carries a large roll of film, or is out of round, or rotates with a certain amount of radial and/or axial play. Such unpredictable random fluctuations of the film tension often result in the generation of noise and in jumping or skipping of projected images because the frames are not properly aligned with the gate during projection. In the case of the spring loaded swingable buffers, it has been found that under circumstances of excessive tension the resonance of the spring contributes to the irregularities in the film projection, rather than compensating for the same.

To overcome this deficiency it has been proposed in U.S. Pat. No. 2,838,304 to Berkenhoff to provide means whereby the roll on a swing arm type buffer is placed in a position to be rotatably driven by a drive belt from the projection motor in a film advancing direction in those circumstances when the film on the reel offers great resistance to movement. However, such device tends to overcompensate for excessive film tension by advancing more film from the supply reel than can be immediately taken up by the transport means.

The problem of spring resonance has been dealt with in U.S. Pat. No. 3,942,883 to Osborne et al by utilizing a dash pot in operative engagement with the spring loaded swing arm. Unfortunately, such a device also includes a supplemental torque motor responsive to film tension and accordingly is extremely costly and complex.

Another complex film damping device, which utilizes spring loaded pivotally movable legs over which the film is looped, is shown in U.S. Pat. No. 3,977,775 to Riedel.

SUMMARY OF THE INVENTION

In accordance with the present invention, an improved, inexpensive film buffer for motion picture projectors of the type having a supply reel and a film transport mechanism for incrementally advancing each frame of the film through a film gate, is provided which overcomes the deficiencies found in the prior art by compensating for film tension variations resulting from both the intermittent feed of the film from a continuously rotating supply reel and excessive drag resulting from unpredictable random sources.

The film buffer of the invention comprises a counter-balanced bracket pivotally mounted on the face of a projector between the film supply reel and the film transport mechanism; and a pair of rollers rotatably connected to said bracket at opposite ends thereof to create an S-shaped loop in the film during its path of travel from the supply reel to a film transport mechanism, said bracket being responsive to the tension of the film upon the rollers to swing in a direction to decrease the film loop size and thereby shorten the film path and increase the amount of film supplied to the transport means when said tension exceeds a desired limit. The bracket is counter-balanced by means of a counterweight fixedly connected thereto and swingable therewith to pivotally bias the same into a direction to increase said film loop size to hold the bracket against movement under the normal tension of the film and to decrease the film loop size under excessive tension of the film.

Moreover, the force exerted by the counterweight upon the film, when combined with the tendency of the film to increase in loop size due to its inherent elasticity, increases the unwinding force upon the supply reel to loosen or free any jams which impair the free rotation of the reel.

The bracket is preferably L-shaped and includes means at the distal end of each leg defining the L for mounting the film rollers. The bracket is pivotally mounted on the face of the projector at the intersection of the two legs in a manner such that the film from the supply reel extends over and beneath the roller disposed on the vertical leg of the L, and over the roller disposed at the end of the horizontal leg of the L so as to define said S-shaped loop prior to its engagement by the film transport mechanism. The appropriate length of the bracket legs depends upon the size of the film, its weight and the weight of the counterweight, and will be readily determinable for various projectors by those skilled in the art. The bracket is connected to the projector by means of a pin which fixedly engages the bracket by press fit or otherwise and is journaled through a suitable opening formed in the face of the projector. The inner end of said pin is fixedly connected to one end of the counterweight which is disposed internally of the projector.

The counterweight comprises a blade-shaped plate, which in the preferred embodiment resembles a butcher's hatchet, and is formed of steel material to provide sufficient weight. The counterweight extends from the bracket in a direction generally opposite to that of the horizontal leg thereof to provide the desired biasing force. To prevent the counterweight blade from swinging downwardly into a vertical position which would unduly increase the film loop size, holding means are provided to engage the lower edge of the blade and hold the same in a normally horizontal rest position. The holding means comprises a torsion spring having a coil fixedly connected to the inner face of the projector housing, and a horizontally extending elongated arm having a hook shaped member at one end extending from said coil and adapted to receive the blade. The spring serves to absorb the shock and noise of the counterweight when it returns to the rest position, and assists in initially overcoming its inertia to pivotally move the same when sufficient film tension is applied to the rollers.

As an additional feature of the invention one end of the counterweight blade is disposed to operate within the magnetic field of the projector drive motor. The field attracts the blade to damp its movement, and thereby serves to eliminate vibration and noise.

Unlike buffer devices of the prior art, the present invention compensates for irregularities in the force required to unwind the film from the supply reel without imparting a resonance to the film, and without placing undue strain upon the film transport mechanism. This is accomplished by utilizing the natural elasticity of the film for normal predictable variations in tension created by the incremental movement of the film by its transport mechanism, and by utilizing the counterweight to compensate for increased film tension in extreme circumstances. The use of the torsion spring and the magnetic field in conjunction with the counterweight improves its operating characteristics by eliminating vibration and noise.

The present invention is described more fully in reference to the annexed drawings.

DETAILED DESCRIPTION OF THE PREFERRED EMBODIMENT

Figure 1:
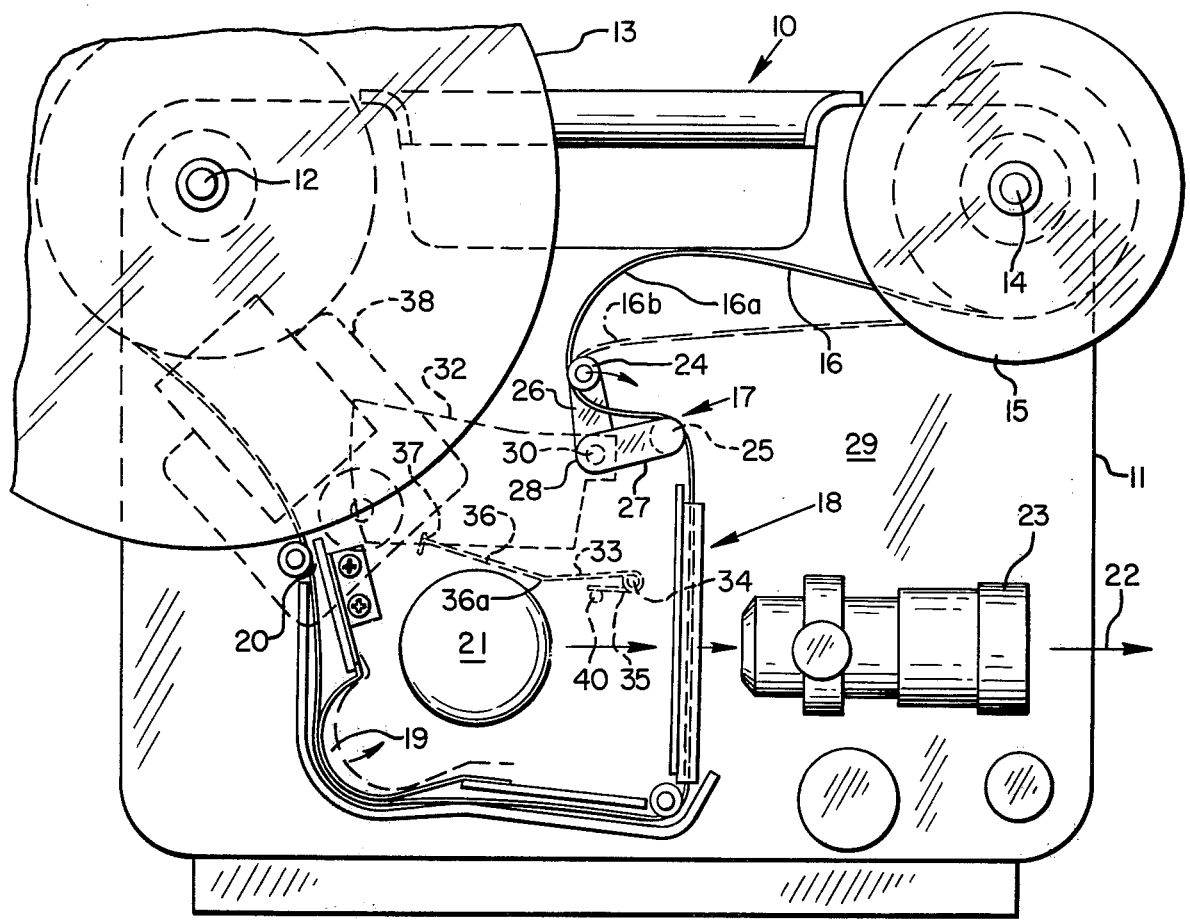
FIG. 1 is a front plan view of a motion picture projector incorporating the film buffer of the invention.

Referring now to FIG. 1, a motion picture projector is indicated generally at 10 consisting of a projector housing 11 upon which is journaled a spindle 12 supporting a take-up reel, shown fragmatically at 13. A second spindle 14 is journaled at the forward path of case 11 and mounts a supply reel 15 of conventional design carrying film 16. The path of the film 16 as it is advanced from supply reel 15 to take-up reel 13 in the direction of forward projection extends around a film buffer 17 in accordance with the invention to form an S-shaped loop 16a therein, passes through a film gate assembly 18 containing the operative portions of a film transport mechanism comprising a film engaging claw (not shown), through rear buffer means 19, and finally through a take-up exit means 20. A projection bulb 21 illuminates the film as each frame is advanced incrementally past the optical axis 22 by means of the film engaging claw for projection on a remote screen through a lens assembly 23 of conventional design. The film engaging claw is adapted to engage and advance the film in a step-wise motion, whereby each frame is incrementally stopped as it is aligned with the optical axis for projection.

Upon the initial advancement of the film 16 through gate 18, the stationary inertia of reel 15 is overcome and the reel begins to rotate. As each frame is stopped on the optical axis, reel 15 continues to rotate in a clockwise unwinding direction due to its inertia and the elasticity of the film, and thereby temporarily increases the size of film loop 16a until the next incremental downward movement of the film due to the operation of the claw. In the event that there is excessive drag on the film by reel 15, there is a tendency for the reel to stop turning as the film stops at each frame. If this occurs, the size of loop 16a is reduced as the movement of the film continues, and additional tension is placed upon the film 16 and the reel 15. It is the purpose of film buffer 17 to overcome and absorb the irregularities in film tension due to variations in the drag of the supply reel to insure smooth projection of the film as it is incrementally advanced through the projection gate 18.

Figure 2:
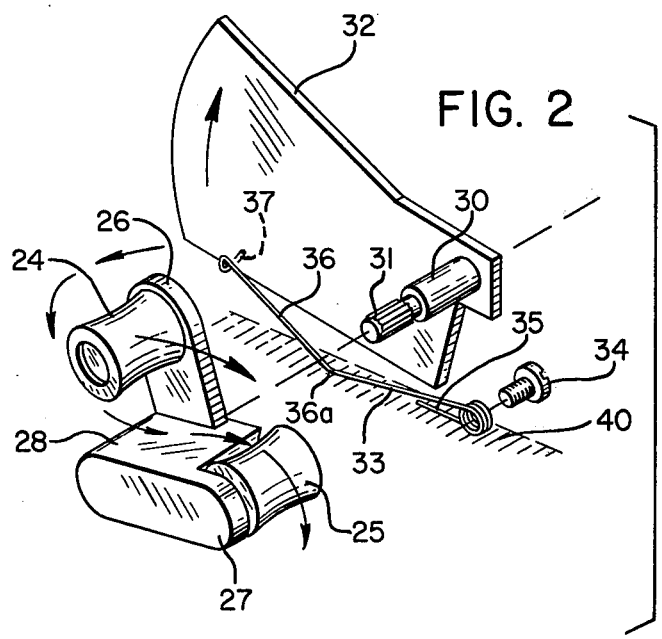
FIG. 2 is an exploded perspective view illustrating the several component parts of the film buffer of this invention.

The buffer 17 comprises a pair of film guide rollers 24 and 25 over which the film 16 passes to define loop 16a therein. The rollers 24 and 25 are rotatably carried at the distal ends of vertical and horizontal legs 26 and 27, respectively, of an L-shaped bracket 28. Bracket 28 is pivotally mounted on the projector by means of a pin 30 having a knurled end 31, which is journaled through a suitable opening formed in the face 29 of the housing 11. Knurled end 31 of pin 30 fixedly engages a corresponding opening formed in bracket 28 at the intersection of the vertical and horizontal legs 26 and 27, respectively. The other end of pin 30 extends interiorly of the housing and is fixedly connected to one end of a blade-shaped counterweight 32, shown perspectively in FIG. 2, and in phantom in FIG. 1. Blade 32 is formed of steel material and serves to pivotally bias bracket 28 in a counter-clockwise direction. A torsion spring 33 is connected to the inside of face 29 of the projector housing 11 adjacent blade 32 by means of a screw 34 or the like, shown in FIG. 2. In this regard, a pin may be molded into the housing of the projector and substituted for screw 34. The spring 33 has a short spring arm 35 which rests upon a shelf 40 inwardly extending from face 29 of the housing 11 to support the spring in the horizontal position shown in the drawings. A long arm 36 of spring 33 is formed with a hook like section 37 at the end thereof and is adapted to receive and support the under surface of blade 32 in its rest position as shown. An elbow 36a formed in the spring 33 rests on the shelf 40. A projector drive motor 38 for the film transport means and the other operative components of the projector are disposed within housing 11 below take-up spindle 12. Counterweight blade 32 is positioned such that it moves within and is attracted by the magnetic field emitted by the coil of motor 38.

In operation, as the film 16 is pulled downward by the film advancing claw the film tends to tighten around rollers 24 and 25 reducing the size of loop 16a, as shown in FIG. 1 by the dotted line 16b. Due to the inherent elasticity of the film there is an internal force tending to increase the size of the loop and thus exert a force upon reel 15 to rotate the same in a clockwise direction to unwind additional film. In this manner, the film is smoothly advanced through each incremental step movement, since all changes in movement of the film are absorbed by the increasing and decreasing size of the film loop. The counterweight 32 supplies inertia to the buffer 17 so that it will not ordinarily respond to the quick discrete movements of the film as it is advanced incrementally through the gate. However, if the supply reel tends to hold back or the film should stick within the supply reel, the force exerted by the downward movement of the film will cause the buffer 17 to overcome the inertia of the counterweight and move in a clockwise direction lifting blade 32 from spring 33. In this manner, downward movement of the film and its inherent elasticity, as well as the force exerted by the counterweight combine to provide a greater unwinding force upon the supply reel to loosen the film. Furthermore, as a result of the pivotal movement of buffer 17, the film path between the reel and the gate will be shortened to provide additional film from the loop to be fed to the gate in order to minimize the forces acting on the claw. As the film unwinds, the buffer is again lowered against the spring 33 reducing the action of the buffer and allowing the natural elasticity of the film to again take control. The attraction force created by the magnetic field upon blade 32 damps the movement of the counterweight and thereby eliminates vibration and noise.

Although the film buffer of the invention has been described with reference to a single embodiment, modifications, variations and additional embodiments within the scope of this invention will be apparent to those skilled in the art.

What is claimed is:

1. In a motion picture projector of the type having an electric drive motor with a magnetic field, a film supply reel and a film transport mechanism for incrementally advancing each frame of the film through a projection gate, an improved buffer for the film comprising a bracket pivotally disposed between the supply reel and the film transport mechanism; a pair of rollers for the film rotatably connected to said bracket to form a loop in the film in its path of travel to exert an unwinding force upon the supply reel; and a steel counterweight fixedly connected to the bracket and swingable therewith to pivotally bias the same into a direction to increase the film loop size to hold the bracket against movement under normal tension of the film and to decrease the film loop size and exert increased force upon the film to unwind the supply reel when said tension exceeds a predetermined limit; said counterweight being disposed within the magnetic field of the drive motor to damp its motion and reduce vibration and noise.

2. A film buffer in accordance with claim 1, in which said bracket is counterbalanced by means of a weighted member fixedly connected thereto and swingable therewith to pivotally bias the same into a direction to increase the film loop size to hold the bracket against movement under normal tension of the film and to exert increased force upon the film to unwind the supply reel upon the response of the bracket.

3. A film buffer in accordance with claim 1, in which means are included to mount the bracket to the projector at the intersection of the horizontal and vertical legs.

4. A film buffer in accordance with claim 1 in which the counterweight comprises a blade-shaped plate.

5. A film buffer in accordance with claim 1, in which means are provided to support the counterweight in a rest position.

6. A film buffer in accordance with claim 5, in which the support means comprises a torsion spring mounted on the projector and having an elongated leg with a hook-like member at the end thereof to engage the counterweight to absorb the shock of the counterweight when it returns to the rest position, and assist in initially overcoming its inertia to pivotally move the same when the film tension exceeds the predetermined limit.

7. A buffer to compensate for irregularities in film movement in motion picture projectors incorporating a supply reel for film, an electric drive motor having a magnetic field and a film transport means for advancing the film step-wise through a projection gate comprising roller means for forming a loop in the film pivotally disposed on the projector between the supply reel and the transport means and responsive to the tension of the film to swing in a direction to decrease the loop size to thereby supply additional film to the transport means; and a weighted member formed of magnatizable material fixedly connected to the roller means and swingable therewith to pivotally bias the same into a direction to increase the loop size to hold the roller means against movement under normal tension of the film attributable to its step-wise motion and to provide unwinding force to the supply reel when the film is subjected to increased tension created by other factors; said weighted member being disposed within the magnetic field of the drive motor to damp its motion, increase its biasing force and reduce vibration and noises.

8. A film buffer in accordance with claim 7, in which means are provided to support the weighted member within the magnetic field in a rest position.

9. A film buffer in accordance with claim 8, in which the support means comprises a torsion spring adapted to cushion the weighted member when it returns to the rest position and to assist in overcoming its inertia when the film tension is sufficient to pivotally swing the roller means.

* * * * *